(12) United States Patent
Choi et al.

(10) Patent No.: US 12,738,556 B2
(45) Date of Patent: Sep. 15, 2026

(54) BATTERY MODULE AND BATTERY PACK INCLUDING THE SAME

(71) Applicant: LG Energy Solution, Ltd., Seoul (KR)

(72) Inventors: Yongjoon Choi, Daejeon (KR); Myungki Park, Daejeon (KR); Jonghwa Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1207 days.

(21) Appl. No.: 17/434,469

(22) PCT Filed: Jun. 22, 2020

(86) PCT No.: PCT/KR2020/008064

§ 371 (c)(1),
(2) Date: Aug. 27, 2021

(87) PCT Pub. No.: WO2021/080113

PCT Pub. Date: Apr. 29, 2021

(65) Prior Publication Data

US 2022/0140414 A1 May 5, 2022

(30) Foreign Application Priority Data

Oct. 25, 2019 (KR) ........................ 10-2019-0133805

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/647* (2015.04);
(Continued)

(58) Field of Classification Search
None
See application file for complete search history.

(56) References Cited

U.S. PATENT DOCUMENTS

2008/0057392 A1 3/2008 Takamatsu et al.
2012/0121965 A1* 5/2012 Makino .................. H01M 4/70 429/163

(Continued)

FOREIGN PATENT DOCUMENTS

CN 209282261 U 8/2019
DE 102018133391 A1 6/2019

(Continued)

OTHER PUBLICATIONS

JPS5398315U English translation from Espacenet (Year: 1978).*

(Continued)

*Primary Examiner* — Jonathan G Leong
*Assistant Examiner* — Claire A Rutiser
(74) *Attorney, Agent, or Firm* — Lerner David LLP

(57) ABSTRACT

A battery module for enhancing cooling performance, and a battery pack including the same may include a battery cell stack, in which a plurality of battery cells are stacked, a U-shaped frame accommodating the battery cell stack and having an opened upper portion, an upper plate covering the battery cell stack on the opened upper portion of the U-shaped frame, and a thermally conductive resin layer formed between the battery cell stack and a bottom surface of the U-shaped frame, and the upper plate may include a recessed portion formed to be recessed in a direction in which the battery cell stack is located, and a battery pack including the same.

9 Claims, 7 Drawing Sheets

(51) Int. Cl.
*H01M 10/647* (2014.01)
*H01M 10/6554* (2014.01)
*H01M 50/209* (2021.01)

(52) U.S. Cl.
CPC ..... *H01M 10/6554* (2015.04); *H01M 50/209* (2021.01); *H01M 2220/20* (2013.01)

(56) References Cited

U.S. PATENT DOCUMENTS

| | | | |
|---|---|---|---|
| 2014/0087231 | A1 | 3/2014 | Schaefer et al. |
| 2018/0316070 | A1 | 11/2018 | Lee et al. |
| 2019/0006647 | A1 | 1/2019 | Ryu et al. |
| 2019/0131596 | A1 | 5/2019 | Yang et al. |
| 2019/0198952 | A1 | 6/2019 | Choi et al. |
| 2020/0220124 | A1 | 7/2020 | Park et al. |
| 2020/0365855 | A1 | 11/2020 | Murayama et al. |

FOREIGN PATENT DOCUMENTS

| | | | | |
|---|---|---|---|---|
| EP | 3675223 | A1 | | 7/2020 |
| JP | S5398315 | U | * | 8/1978 |
| JP | 2018056112 | A | | 4/2018 |
| JP | 2018181746 | A | | 11/2018 |
| JP | 2019083145 | A | | 5/2019 |
| KR | 20140016326 | A | | 2/2014 |
| KR | 20170121555 | A | | 11/2017 |
| KR | 20180018109 | A | | 2/2018 |
| KR | 20180107473 | A | | 10/2018 |
| KR | 20190030984 | A | | 3/2019 |
| KR | 20190078521 | A | | 7/2019 |
| KR | 20190106060 | A | | 9/2019 |
| WO | 2019088625 | A1 | | 5/2019 |
| WO | 2019167689 | A1 | | 9/2019 |

OTHER PUBLICATIONS

Search report from International Application No. PCT/KR2020/008064, mailed Sep. 28, 2020.

Extended European Search Report including Written Opinion for Application No. 20879896.7 dated Mar. 24, 2022, pp. 1-7.

* cited by examiner

【FIG. 1】
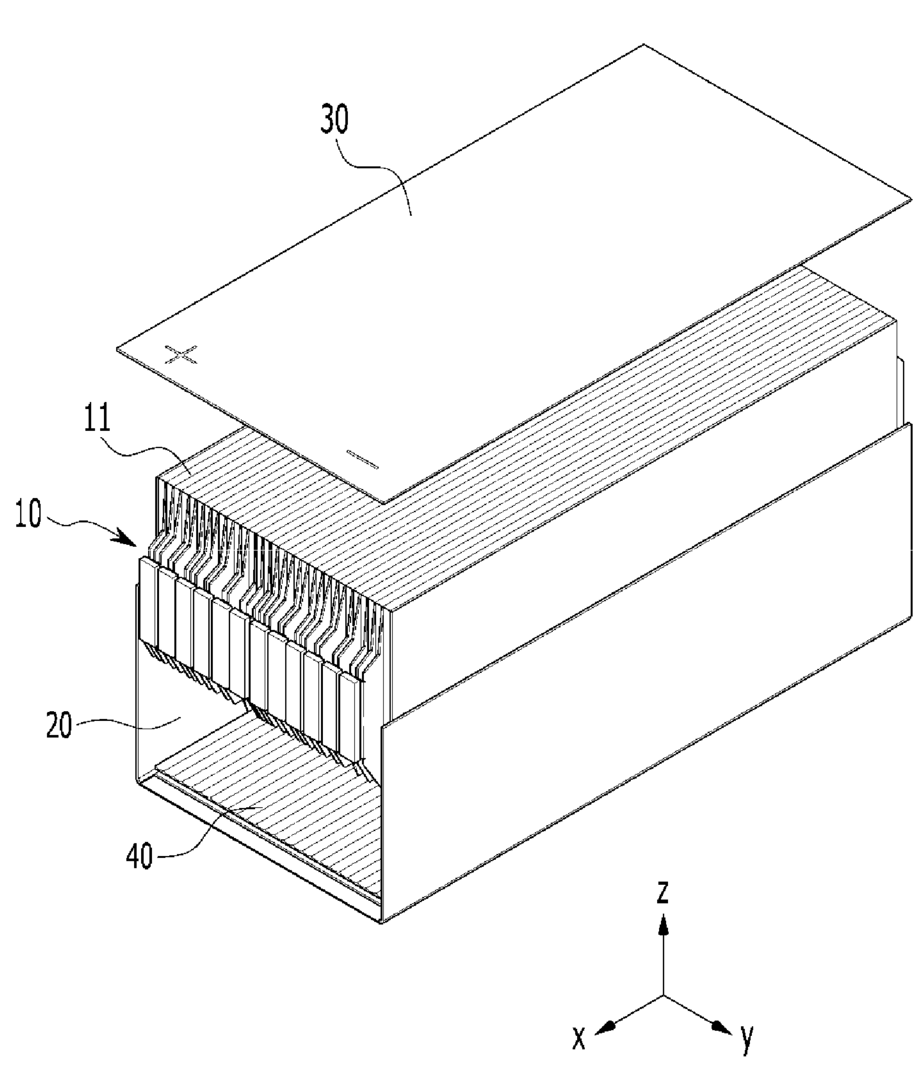
PRIOR ART

【FIG. 2】
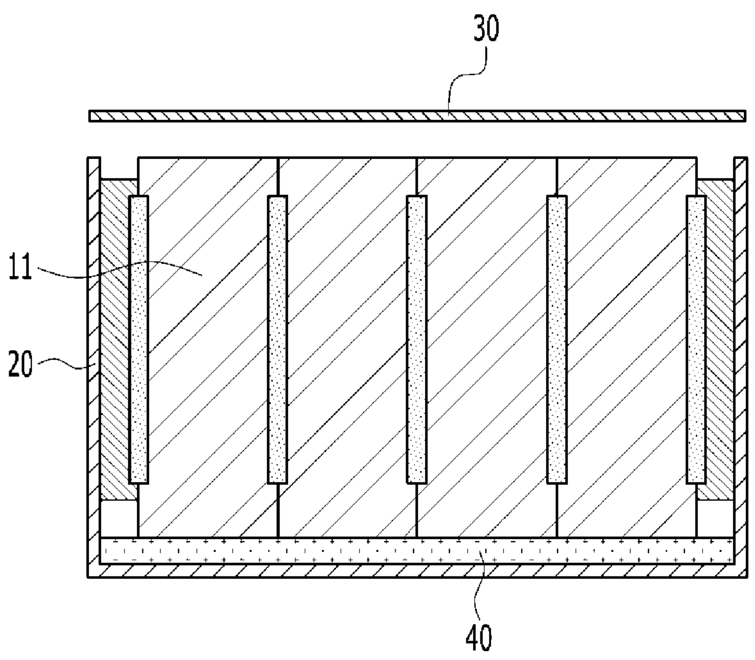
PRIOR ART

【FIG. 3】
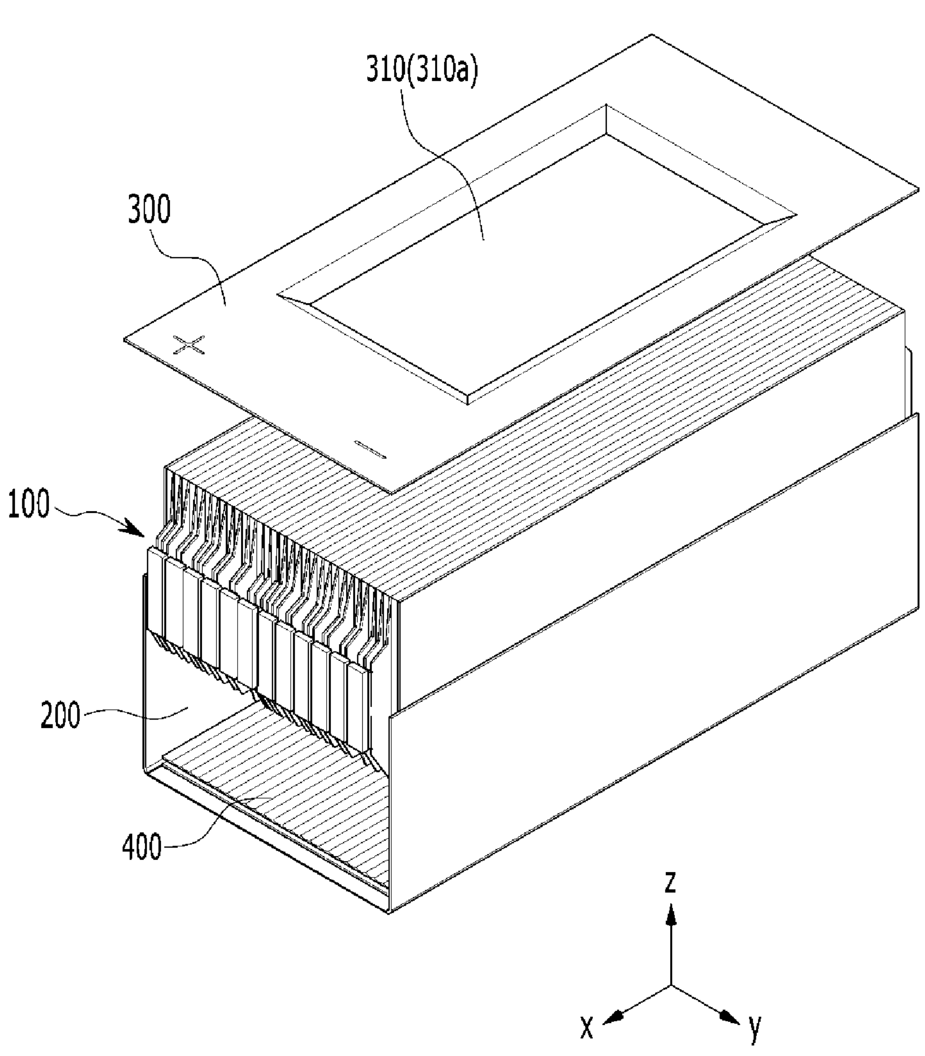

【FIG. 4】
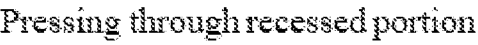
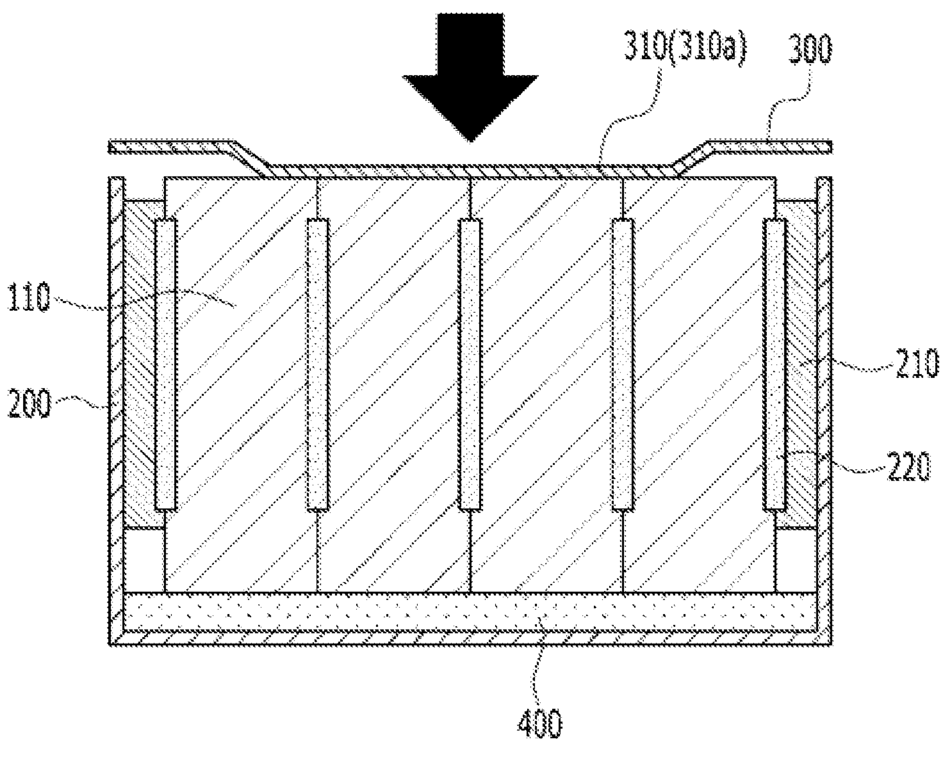
【FIG. 5】
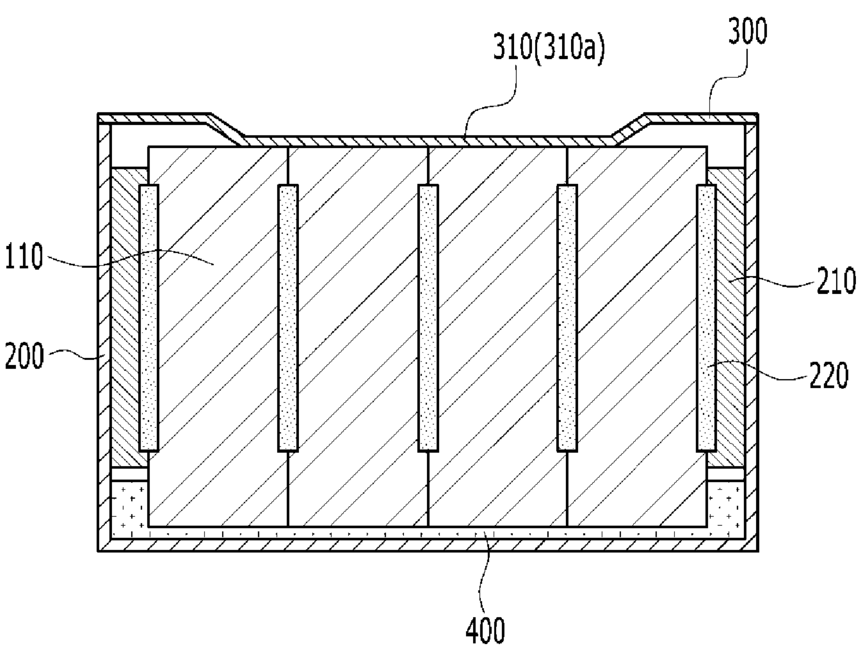

【FIG. 6】
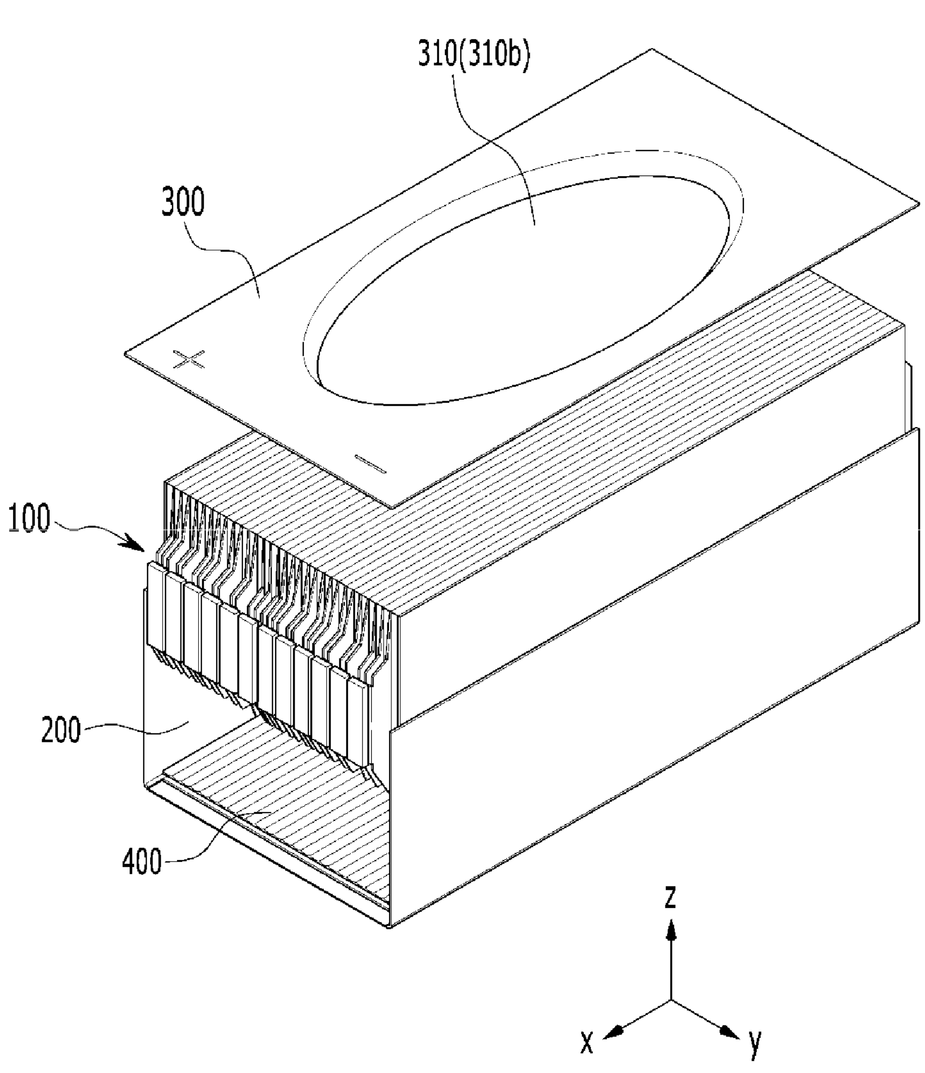

【FIG. 7】
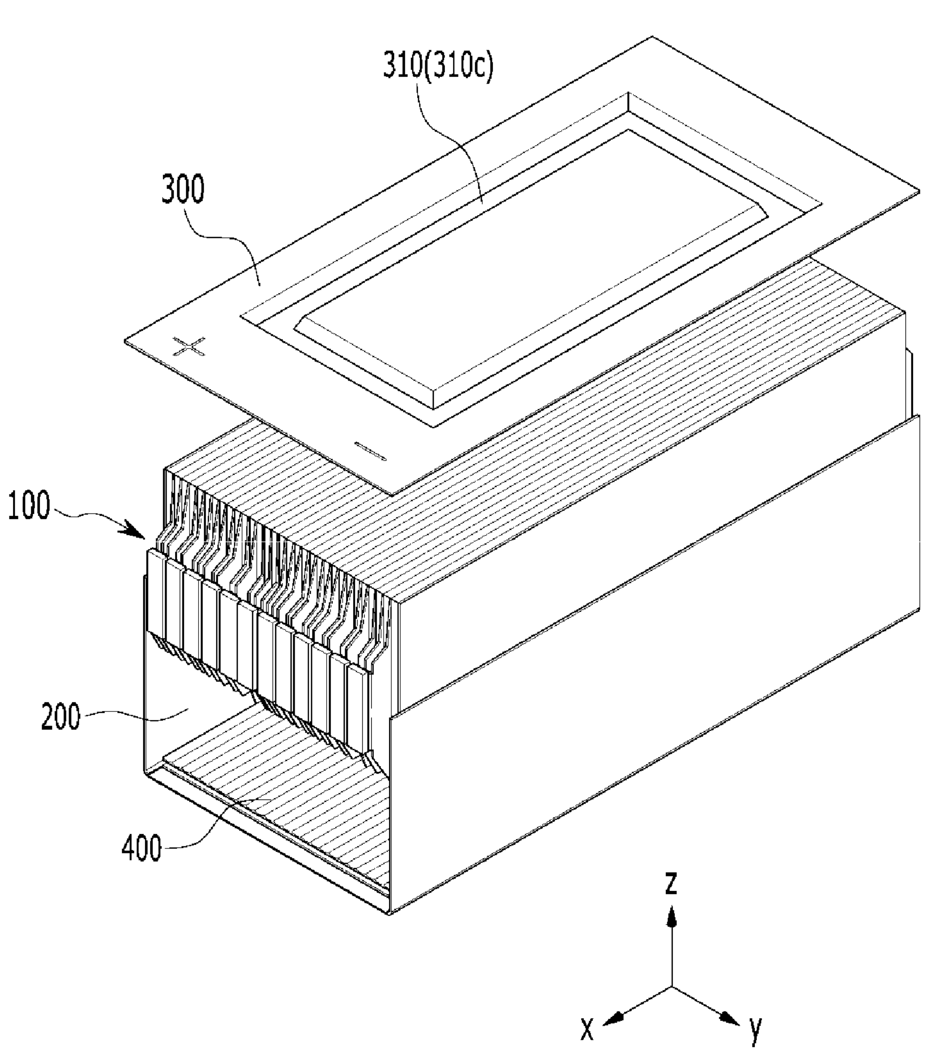

【FIG. 8】
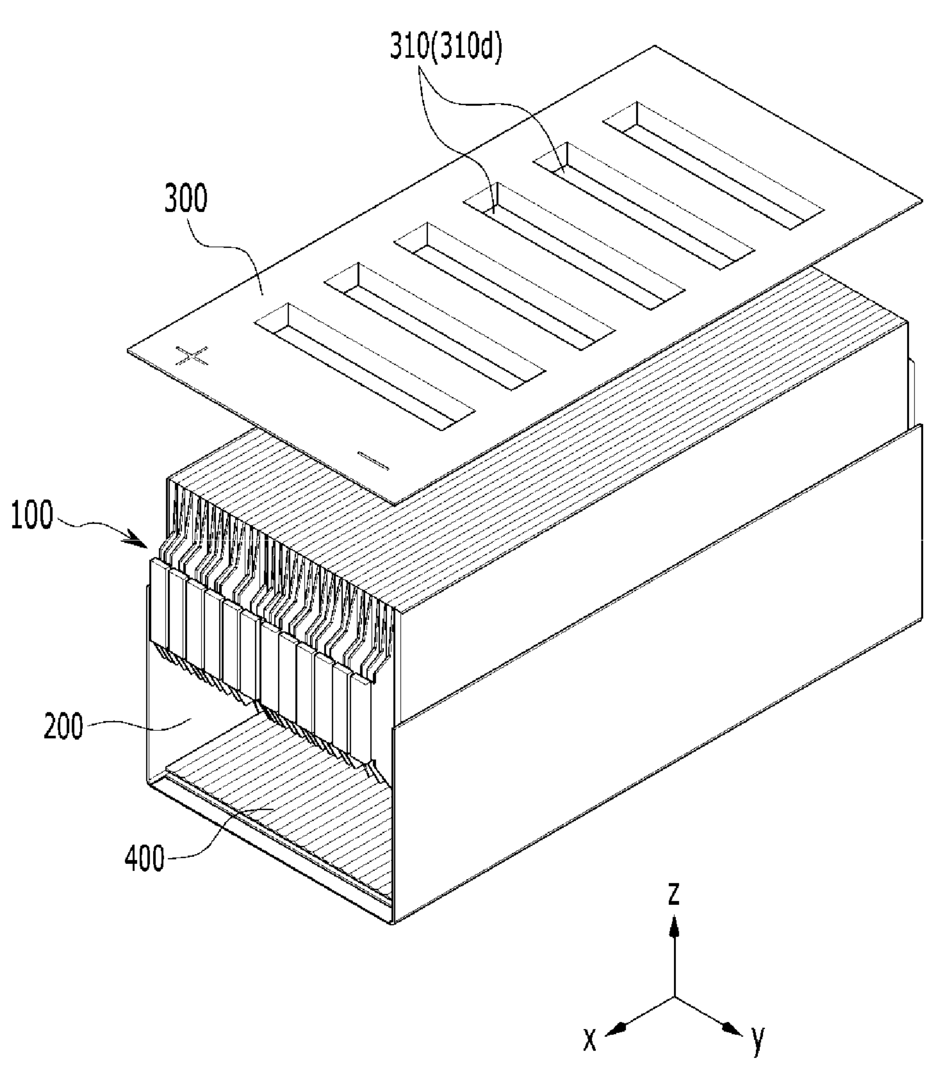

BATTERY MODULE AND BATTERY PACK INCLUDING THE SAME

CROSS-REFERENCE TO RELATED APPLICATIONS

This application is a national phase entry under 35 U.S.C. § 371 of PCT/KR2020/008064 filed on Jun. 22, 2020 and claims the benefit of Korean Patent Application No. 10-2019-0133805 filed on Oct. 25, 2019 with the Korean Intellectual Property Office, the disclosure of which are each incorporated herein by reference in their entirety.

TECHNICAL FIELD

The present disclosure relates to a battery module and a battery pack including the same, and more particularly to a battery module that improves cooling performance, and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell, and to configure a battery pack by using at least one of the battery modules and adding other components.

Such a battery module includes a battery cell stack in which a plurality of battery cells are stacked, a U-shaped frame accommodating the battery cell stack and having opened upper portion, an upper plate covering the battery stack on the upper portion of the U-shaped frame, and a thermally conductive resin layer formed between the battery cell stack and a bottom surface of the U-shaped frame.

FIG. 1 is a perspective view illustrating a battery module according to the related art. FIG. 2 is a schematic diagram illustrating a cross-section of the battery module according to the related art in FIG. 1.

The battery module according to the related art includes a battery cell stack 10, in which a plurality of battery cells 11 are stacked, a U-shaped frame 20 accommodating the battery cell stack and having opened upper portion, an upper plate 30 formed to be flat while covering the upper portion of the battery cell stack, and a thermally conductive resin layer 40 formed between the battery cell stack 10 and a bottom surface of the U-shaped frame 20.

In order to cool the battery module, a component or a material that can transfer heat between the battery cell and a frame has to be used. Generally, the component or the material that can transfer heat uses a thermal pad or a thermally conductive resin layer, the heat transfer coefficient of which is high, and if the intervals between the battery cells and the frame are not uniform or are not large, the cooling efficiency of the battery module may deteriorate. Accordingly, in order to efficiently cool the battery module, the battery module has to be designed so as to maintain the same or minimum interval between the battery cell and the frame

DETAILED DESCRIPTION OF THE INVENTION

Technical Problem

It is an object of the present disclosure to provide a battery module capable of improving cooling performance of the battery module having a U-shaped frame shape, and a battery pack including the same.

Technical problems to be solved by the present disclosure are not limited to the above-mentioned technical problems, and other technical problems, which are not mentioned above, may be clearly understood from the following descriptions by those skilled in the art to which the present disclosure pertains.

Technical Solution

In accordance with an aspect of the present disclosure, there is provided a battery module including a battery cell stack, in which a plurality of battery cells are stacked, a U-shaped frame accommodating the battery cell stack and having an opened upper portion, an upper plate covering the battery cell stack on the opened upper portion of the U-shaped frame, and a thermally conductive resin layer formed between the battery cell stack and a bottom surface of the U-shaped frame, and the upper plate includes a recessed portion formed to be recessed in a direction in which the battery cell stack is located, and a battery pack including the same.

The recessed portion may increase the contact area of the battery cell stack and the thermally conductive resin layer by pressing the battery cell stack downwards.

A compression pad is formed between an outermost battery cell of the battery cell stack and a side surface of the U-shaped frame, and the thickness of a portion of the thermally conductive resin layer, located underneath the compression pad, may be larger than a thickness of a portion of the thermally conductive resin layer, located underneath the battery cell stack.

The recessed portion may be formed to be recessed so as to correspond to all of the plurality of battery cells in a vertical direction.

The recessed portion may be recessed in a rectangular shape.

The recessed portion may be recessed in an elliptical shape.

The recessed portion may be recessed along a periphery of the upper plate.

The recessed portion may be formed of a plurality of elongated recessed portions.

The elongated recessed portions may extend in a direction that is perpendicular to the lengthwise directions of the plurality of battery cells and may be formed to be recessed so as to correspond to all of the plurality of battery cells in a vertical direction.

Advantageous Effects

The battery module and the battery pack according to the embodiment of the present disclosure minimize the interval between the battery cells and the frame to improve structural stability when an external load is applied, improve the fixing forces of the battery cells to the frames against the external load, and minimize the interval between the upper plate and the battery module to reduce the usage of a resin forming the thermally conductive resin layer, thereby securing the competitiveness of the battery module.

The effects of the present disclosure are not limited to the above-mentioned effects, and other effects not mentioned will be clearly understood by those skilled in the art from the description of the claims.

BRIEF DESCRIPTION OF THE DRAWINGS

FIG. 1 is a perspective view illustrating a battery module according to the related art;

FIG. 2 is a schematic diagram illustrating a cross-section of the battery module according to the related art in FIG. 1;

FIG. 3 is an exploded perspective view illustrating a battery module according to an embodiment of the present disclosure;

FIG. 4 is a conceptual view illustrating a cross-section of the battery module before an upper plate is mounted according to the embodiment of the present disclosure;

FIG. 5 is a conceptual view illustrating a cross-section of the battery module after the upper plate is mounted according to the embodiment of the present disclosure;

FIG. 6 is a view illustrating a recessed portion 310*b* according to a modified embodiment of the present disclosure;

FIG. 7 is a view illustrating a recessed portion 310*c* according to a modified embodiment of the present disclosure; and FIG. 8 is a view illustrating a recessed portion 310*d* according to a modified embodiment of the present disclosure.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Hereinafter, a battery module according to an embodiment of the present disclosure will be described with reference to FIGS. 3 to 5.

FIG. 3 is an exploded perspective view illustrating a battery module according to an embodiment of the present disclosure. FIG. 4 is a conceptual view illustrating a cross-section of the battery module before an upper plate is mounted according to the embodiment of the present disclosure. FIG. 5 is a conceptual view illustrating a cross-section of the battery module after the upper plate is mounted according to the embodiment of the present disclosure.

Referring to FIGS. 3 to 5, the battery module according to the embodiment of the present disclosure includes a battery cell stack 100, in which a plurality of battery cells 110 are stacked, a U-shaped frame 200 accommodating the battery cell stack 100 and having opened upper portion, an upper plate 300 covering the battery cell stack 100 on the upper portion of the opened U-shaped frame 200, and a thermally conductive resin layer 400 formed between the battery cell stack 100 and a bottom surface of the U-shaped frame 200, and the upper plate 300 includes a recessed portion 310 formed to be recessed in a direction in which the battery cell stack 100 is located.

The battery cell 110 may be a secondary battery, and may be a pouch type secondary battery. The battery cells 110 may be formed of a plurality of battery cells and the plurality of the battery cells 110 may be stacked to be electrically connected to each other to form the battery cell stack 100. Each of the plurality of the battery cells may include an electrode assembly, a battery case, and electrode leads protruding from the electrode assembly.

The U-shaped frame 200 is formed such that the upper portion thereof is opened, and to accommodate the battery cell stack 100. The U-shaped frame 200 is formed of two side surface parts, which face each other, and a bottom part, and the battery cell stack 100 is accommodated in the interior of the U-shaped frame 200 such that left and right surfaces thereof correspond to the two side surface parts of the U-shaped frame 200, respectively, and the lower surface thereof corresponds to the bottom part of the U-shaped frame 200.

A compression pad 210 may be formed between the outermost battery cell of the battery cell stack 100 and the side surface part of the U-shaped frame 200. Swelling caused by the battery cells 110 may be absorbed through the compression pad 210.

A double-sided tape 220 may be formed between the battery cells 110 of the battery cell stack 100, and between the outermost battery cell of the battery cell stack 100 and the compression pad 210. The battery cells 110 and the compression pad 210 may be bonded to each other through the double-sided tape 220 to be fixed.

The upper plate 300 is formed so as to cover the battery cell stack 100 on the opened upper portion of the U-shaped frame 200. Then, the upper plate 300 and the U-shaped frame may be joined to each other through welding. The upper, lower, left, and right sides of battery cell stack may be covered by the U-shaped frame 200 and the upper plate 300.

A thermally conductive resin layer 400 may be formed between the bottom surface of the U-shaped frame 200 and the battery cell stack 100. The thermally conductive resin layer 400 is formed of a resin and makes contact with the plurality of battery cells 110 to transfer heat generated from the plurality of battery cells 110 to the outside to cool the battery module.

The upper plate 300 may include the recessed portion 310 formed to be recessed in a direction in which the battery cell stack 100 is located. The recessed portion 310 is formed to be recessed so as to correspond to all of the plurality of battery cells 110 in a vertical direction.

In order to fix the battery cells and the like in the interior of battery module according to the related art, the battery cells in the interior of the battery module are fixed through a surface pressure of a compression pad, a double-sided tape attached between the battery cells, and a thermally conductive resin layer formed at lower ends of the battery cells.

According to the embodiment of the present disclosure, the recessed portion 310 is formed in a direction in which the battery cell is located and the recessed portion 310 presses the battery cell stack 100 from the upper portion to the lower side to minimize an interval between the U-shaped frame 200 and the plurality of battery cells 110, thereby increasing the fixing force of the plurality of battery cells 110 and increasing the structural stability of the plurality of the battery cells 110 against an external load.

Further, the recessed portion 310 may increase the contact area of the battery cell stack 100 and the thermally conductive resin layer 400 by pressing the battery cell stack 100 downwards. The lower ends of the plurality of battery cells 110 are formed to be curved so that the thermally conductive resin layer 400 may be inserted between curves formed by the plurality of battery cells 110 when the battery cell stack 100 is pressed downwards, and through this, the contact areas of the plurality of battery cells 110 and the thermally conductive resin layer 400 may increase. As the contact area of the battery cell stack 100 and the thermally conductive resin layer 400 increases, the cooling performance of the battery module may be enhanced.

Further, as the interval between the battery cell stack 100 and the bottom surface of the U-shaped frame 200, between which the thermally conductive layer 400 is interposed, is relatively decreased, the thickness of the thermally conductive resin layer 400 may be decreased, and through this, the usage of the resin forming the thermally conductive resin layer may be can be reduced to improve the price competitiveness of the battery module.

A portion of the thermally conductive resin layer 400 formed at the portion corresponding to the battery cell stack 100 may be moved to portions corresponding to the compression pads 210 formed at opposite ends of the U-shaped frame 200. Then, the thickness of a portion of the thermally conductive resin layer 400, which corresponds to the compression pad 210, may be larger than the thickness of a portion of the thermally conductive resin layer 400, which corresponds to the battery cell stack 100 as illustrated in FIG. 5.

Hereinafter, a structure of the upper plates according to the embodiment and modified embodiments of the present disclosure will be described with reference to FIGS. 3, and 6 to 8.

FIG. 3 is an exploded perspective view illustrating the battery module according to the embodiment of the present disclosure. FIG. 6 is a view illustrating a recessed portion 310*b* according to a modified embodiment of the present disclosure. FIG. 7 is a view illustrating a recessed portion 310*c* according to a modified embodiment of the present disclosure. FIG. 8 is a view illustrating a recessed portion 310*d* according to a modified embodiment of the present disclosure.

Referring to FIG. 3, the recessed portion 310*a* according to the embodiment of the present disclosure may be recessed in a rectangular shape. The recessed portion 310*a* of a rectangular shape, which is formed in the upper plate 300, is formed to be recessed so as to correspond to all of the plurality of battery cells 110 in a vertical direction, and presses the plurality of battery cells 110 downwards to improve the fixing force of the plurality of battery cells 110, and increases the contact areas of the plurality of battery cells 110 with the thermally conductive resin layer 400 to improve cooling performance.

Referring to FIG. 6, the recessed portion 310*b* according to the modified embodiment of the present disclosure may be recessed in an elliptical shape. The recessed portion 310*b* of an elliptical shape, which is formed on the upper plate 300, is formed so as to correspond to all of the plurality of battery cells 110 in a vertical direction, and presses the plurality of battery cells 110 downwards to improve the fixing force of the plurality of battery cells 110 and increases the contact areas of the plurality of battery cells 110 with the thermally conductive resin layer 400 to improve cooling performance.

Referring to FIG. 7, the recessed portion 310*c* according to the modified embodiment of the present disclosure may be recessed along a periphery of the upper plate 300. The recessed portion 310*c* of a peripheral shape, which is formed on the upper plate 300, is formed so as to correspond to all of the plurality of battery cells 110 in a vertical direction, presses the plurality of battery cells 110 downwards to improve the fixing force of the plurality of battery cells 110, and increases the contact areas of the plurality of battery cells 110 with the thermally conductive resin layer 400 to improve cooling performance.

Referring to FIG. 8, the recessed portion 310*d* according to the modified embodiment of the present disclosure is formed while a direction that is perpendicular to the lengthwise directions of the plurality of battery cells 110 is taken as the lengthwise direction thereof, and may include a plurality of the recessed portions 310*d* formed so as to correspond to all of the plurality of battery cells 110 in a vertical direction. The plurality of battery cells 110 are pressed downwards through the plurality of recessed portions 310*d* to improve the fixing force of the plurality of battery cells 110, and increase the contact areas of the plurality of battery cells 110 with the thermally conductive resin layer 400 to improve cooling performance.

The battery module as described above may be included in a battery pack. The battery pack may have a structure in which one or more of the battery modules according to the present embodiment are gathered, and packed together with a battery management system (BMS) and a cooling device that control and manage battery's temperature, voltage, etc.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery cell stack
110: battery cell

200: U-shaped frame
210: compression pad
220: double-sided tape
300: upper plate
310 (310*a*, 310*b*, 310*c*, 310*d*): recessed portion
400: thermally conductive resin layer

The invention claimed is:

1. A battery module comprising:
a battery cell stack, in which a plurality of battery cells each extending in a longitudinal direction are stacked adjacent to one another in a lateral stacking direction perpendicular to the longitudinal direction;
a U-shaped frame accommodating the battery cell stack and having an opened upper portion;
an upper plate covering the battery cell stack on the opened upper portion of the U-shaped frame; and
a thermally conductive resin layer formed between the battery cell stack and a bottom surface of the U-shaped frame,
wherein the upper plate comprises a recessed portion formed to be recessed towards the battery cell stack in a vertical direction in which the battery cell stack is located, the recessed portion extending in the lateral stacking direction across all of the battery cells,
wherein the recessed portion contacts a highest point of each of the battery cells in the vertical direction and presses the battery cells in the vertical direction that is perpendicular to the lateral stacking direction and the longitudinal direction.

2. The battery module of claim 1, wherein,
the recessed portion increases the contact area of the battery cell stack and the thermally conductive resin layer by pressing the battery cell stack downwards.

3. The battery module of claim 1, wherein,
a compression pad is formed between an outermost battery cell of the battery cell stack and a side surface of the U-shaped frame, and
a thickness of a portion of the thermally conductive resin layer located underneath the compression pad is larger than a thickness of a portion of the thermally conductive resin layer located underneath the battery cell stack.

4. The battery module of claim 1, wherein,
the recessed portion is recessed in a rectangular shape.

5. The battery module of claim 1, wherein,
the recessed portion is recessed in an elliptical shape.

6. The battery module of claim 1, wherein,
the recessed portion is recessed along a periphery of the upper plate.

7. The battery module of claim 1, wherein,
the recessed portion is formed of a plurality of elongated recessed portions.

8. The battery module of claim 7, wherein,
each of the elongated recessed portions extend in the lateral stacking direction.

9. A battery pack comprising the battery module of claim 1.

* * * * *